United States Patent [19]
Lombardi et al.

[11] Patent Number: 5,383,620
[45] Date of Patent: * Jan. 24, 1995

[54] APPARATUS FOR FACILITATING THE CHANGING OF SHROUDS IN ARMATURE WINDING MACHINES

[75] Inventors: Massimo Lombardi; Gianluigi Pisani, both of Florence, Italy

[73] Assignee: Axis USA, Inc., Marlborough, Mass.

[*] Notice: The portion of the term of this patent subsequent to Nov. 2, 2010 has been disclaimed.

[21] Appl. No.: 104,360

[22] Filed: Aug. 9, 1993

Related U.S. Application Data

[62] Division of Ser. No. 610,928, Nov. 9, 1990, Pat. No. 5,257,745.

[51] Int. Cl.⁶ .............................................. H02K 15/09
[52] U.S. Cl. .................................................. 242/7.05 B
[58] Field of Search .................. 242/7.05 B, 7.05 R, 242/7.05 C, 7.05 A; 29/598, 605

[56] References Cited

U.S. PATENT DOCUMENTS

| | | | |
|---|---|---|---|
| 1,503,254 | 7/1924 | Sippel et al. | |
| 1,871,970 | 8/1932 | Emmert | |
| 2,348,948 | 5/1944 | Allen | |
| 2,939,641 | 6/1960 | Setley | |
| 2,969,195 | 1/1961 | Leithe | 242/1.1 R |
| 3,345,002 | 10/1967 | Peters | |
| 3,636,621 | 1/1972 | Dammar | 29/596 |
| 3,713,598 | 1/1973 | Bucholtz et al. | 242/7.05 B |
| 3,785,580 | 1/1974 | Kennedy et al. | 242/7.05 B |
| 3,785,583 | 1/1974 | Biddison | 242/7.05 B |
| 3,927,469 | 12/1975 | Dammar | 29/597 |
| 3,927,843 | 12/1975 | Dammar | 242/7.05 B |
| 4,174,815 | 11/1979 | Dammar | 242/7.05 B |
| 4,262,853 | 4/1981 | Dammar | 242/7.05 B |
| 4,520,965 | 6/1985 | Kimura et al. | 242/7.05 B |
| 4,579,291 | 4/1986 | Lombardi et al. | 242/7.05 B |
| 4,765,551 | 8/1988 | Page et al. | 242/7.05 B |
| 4,786,004 | 11/1988 | Boers | 242/7.05 B |
| 4,830,297 | 5/1989 | Walton et al. | 242/7.05 B |
| 4,974,313 | 12/1990 | Reiger | 29/736 |
| 5,064,128 | 11/1991 | Iwase | 242/7.05 B |
| 5,257,745 | 11/1993 | Lombardi et al. | 242/7.05 B |

FOREIGN PATENT DOCUMENTS 1437481 3/1966 France.

*Primary Examiner*—Katherine Matecki
*Attorney, Agent, or Firm*—Fish & Neave; Robert R. Jackson

[57] ABSTRACT

Structures which facilitate changing the shrouds which are used to guide armature coil wires into the slots in electric motor armatures during armature coil winding are shown. The shrouds may need to be changed when armatures of different sizes are to be wound. The disclosed structures provide secure mounting of the shrouds, but also allow the shrouds to be removed and replaced without the need for tools. Other elements which are needed for operating on the armature may also be removably mounted, or may be mounted on the shroud so that when the shroud is changed, these other elements are also automatically changed.

5 Claims, 22 Drawing Sheets

APPARATUS FOR FACILITATING THE CHANGING OF SHROUDS IN ARMATURE WINDING MACHINES

This is a division, of application Ser. No. 07/610,928, filed Nov. 9, 1990, now U.S. Pat. No. 5,257,745, entitled Apparatus for Facilitating the Changing of Shrouds in Armature Winding Machines.

BACKGROUND OF THE INVENTION

This invention relates to machines for winding armatures for electric motors and the like, and more particularly to apparatus for facilitating the changing of the shrouds in such machines when different armatures are to be wound.

Lombardi et al. U.S. Pat. No. 4,579,291 shows armature winding apparatus in which at least some of the shroud structure is movable relative to other shroud structure to allow the machine to be adjusted for winding armatures of different lengths. Boers U.S. Pat. No. 4,786,004 and Walton et al. U.S. Pat. No. 4,830,297 show armature winding apparatus in which the whole shroud can be removed and replaced to allow armatures of different lengths and/or diameters to be wound. In the Boers device a large amount of apparatus must be removed and replaced in order to change shrouds. For example, it appears that relatively large weight 51 must be removed with the shroud during a shroud change operation. In addition, in order to allow the shroud assembly to be slipped on and off head 52, it appears that the shroud assembly must fit relatively loosely on head 52. This may allow the shroud assembly to wobble or at least shift axially relative to head 52 during armature winding. In the Walton et al. device less apparatus must be removed to change a shroud, but although Walton et al. claim to provide quick and easy shroud replacement, the task is clearly more difficult and time-consuming than with the Boers device. For example, the Walton et al. device requires the use of a tool to unscrew clamp screw 102.

In view of the foregoing it is an object of this invention to provide improved armature winding apparatus.

It is a more particular object of this invention to provide armature winding apparatus in which the shrouds are mounted in such a way that they are truly secure but can be changed in the easiest possible manner, preferably without the need for any tools.

SUMMARY OF THE INVENTION

These and other objects of the invention are accomplished in accordance with the principles of the invention by providing armature winding apparatus in which the shrouds and the supporting structure have mating reference surfaces which can be readily separated from one another, but which, when in contact with one another, provide complete stability for the shroud parallel to three mutually perpendicular axes. Quick release means are provided for latching these reference surfaces into contact with one another. This quick release means preferably biases the contacting reference surfaces toward one another, and is also preferably releasable without the need for any tools.

Further features of the invention, its nature and various advantages will be more apparent from the accompanying drawings and the following detailed description of the preferred embodiments.

BRIEF DESCRIPTION OF THE DRAWINGS

FIG. 7 is a partial sectional view taken along the line 7—7 in FIG. 6.

DETAILED DESCRIPTION OF THE PREFERRED EMBODIMENT

Figure 1:
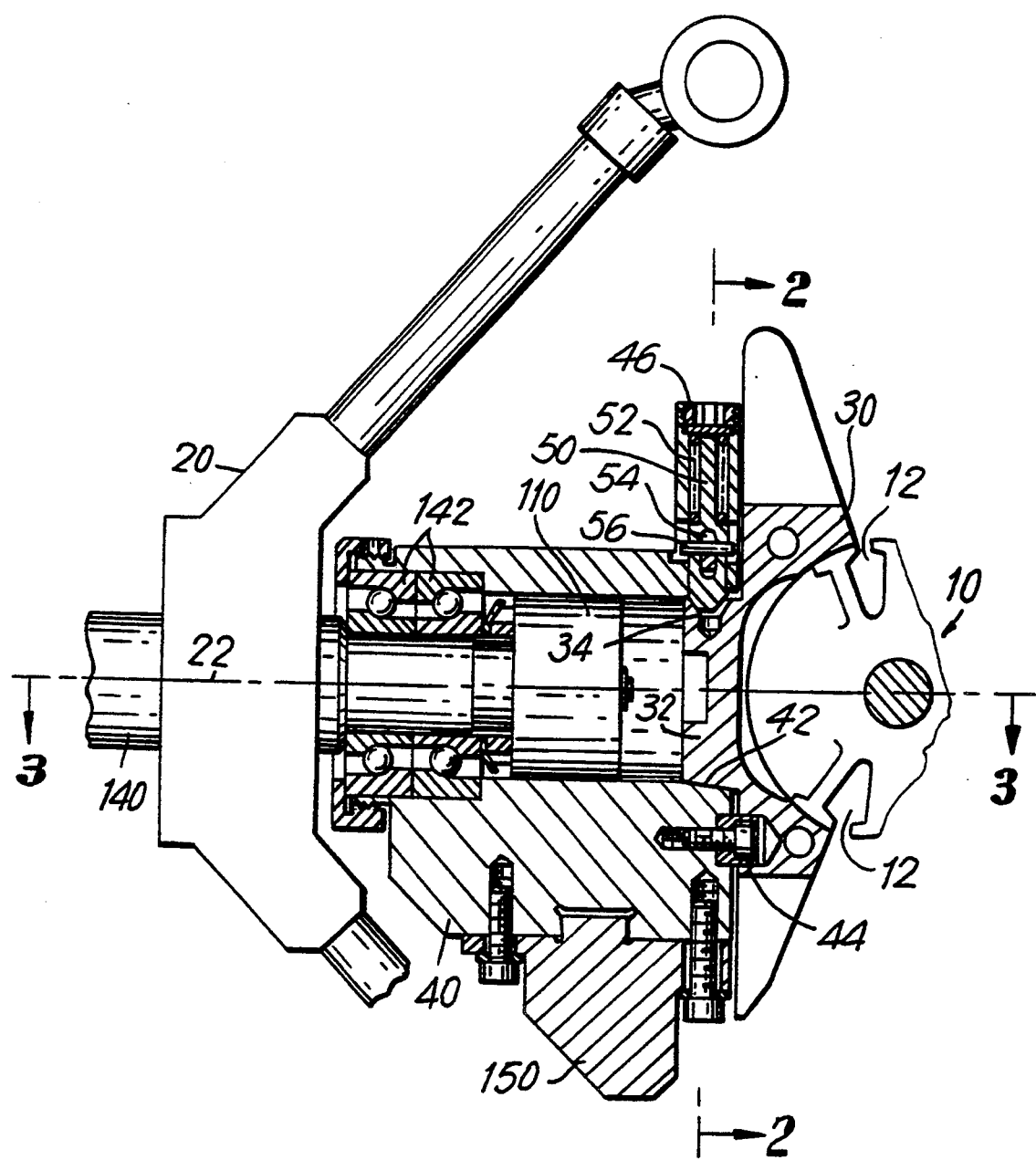
FIG. 1 is an elevational view, partly in section, of a first illustrative embodiment of the invention.

In the illustrative embodiment shown in FIGS. 1-4, an armature 10 to be wound is mounted between two winders. Only the left-hand winder and part of the armature are visible in FIG. 1, but it will be understood that the right-hand winder is similar. Wire supplying flyer 20 rotates about axis 22 in order to wind coils of wire on armature 10 in slots 12. Shroud 30 has surfaces for helping to guide the wire into the armature slots. Armature 10 is rotationally indexed about its longitudinal axis (perpendicular to the plane of the paper in FIG. 1) to position different slots for winding.

In order to enable the apparatus to wind armatures of different diameter and/or length or with different coil configurations it may be necessary to replace shroud 30 with a differently shaped shroud. (Certain changes in armature length alone may be accommodated by adjusting rather than changing shroud 30 as shown in the above-mentioned Lombardi et al. patent.) To facilitate such changes shroud 30 is mounted on the remainder of the winder in accordance with this invention in a manner which will now be described.

The rear of shroud 30 includes a frustoconical projection 32 which fits snugly in a complementary recess 42 in support body 40. A smaller, downwardly directed, frustoconical recess 34 is bored in projection 32 at or near its top. To facilitate this operation, the upper surface of projection 32 may be flattened and made horizontal. Pin 50 is mounted for vertical reciprocation in an upward projection of support body 40 so that a lower frustoconical end of pin 50 can be inserted in or removed from recess 34. Pin 50 is preferably offset from concentricity with recess 34 toward the rear of shroud 30 so that when pin 50 is extended into recess 34, it tends to pull projection 32 into recess 42. Because the center of gravity of shroud 30 is well to the right of pin 50 and recess 34, the force of gravity cooperates with elements 34 and 50 to help hold projection 32 snugly and concentrically in recess 42. Stud 44 which projects from the front face of support body 40 into a recess in shroud 30 also helps ensure the stable positioning of shroud 30 relative to support body 40.

Figure 2:
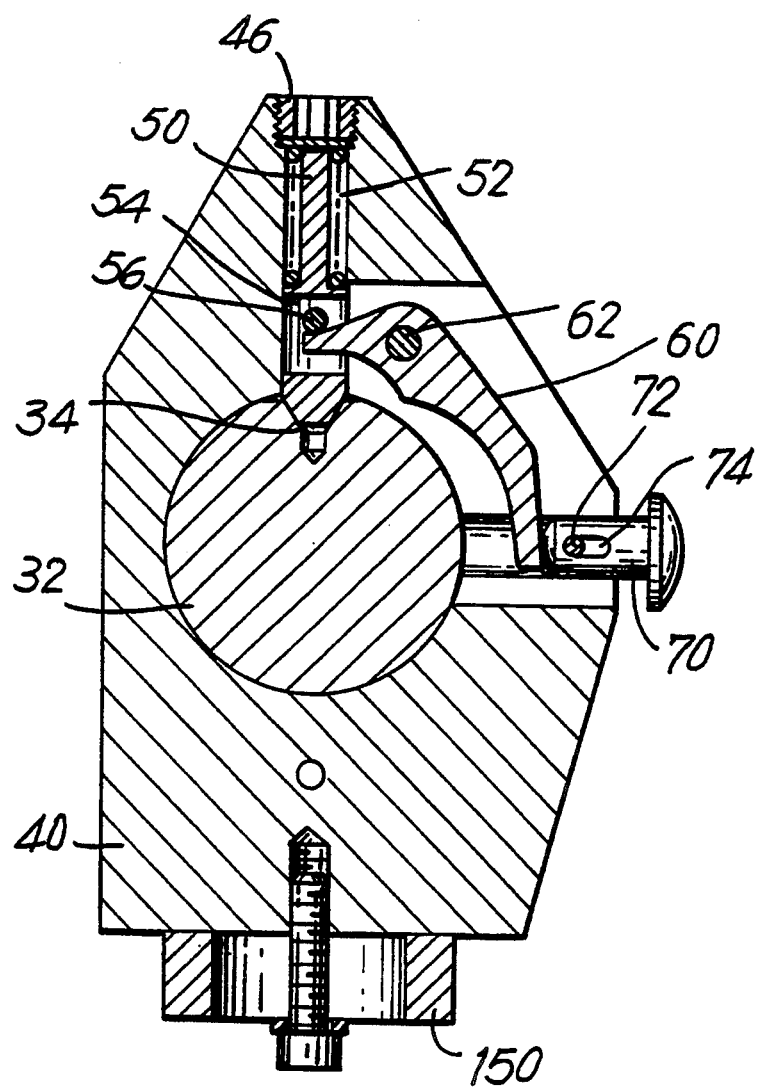
FIG. 2 is a sectional view taken along the line 2—2 in FIG. 1.
Figure 3:
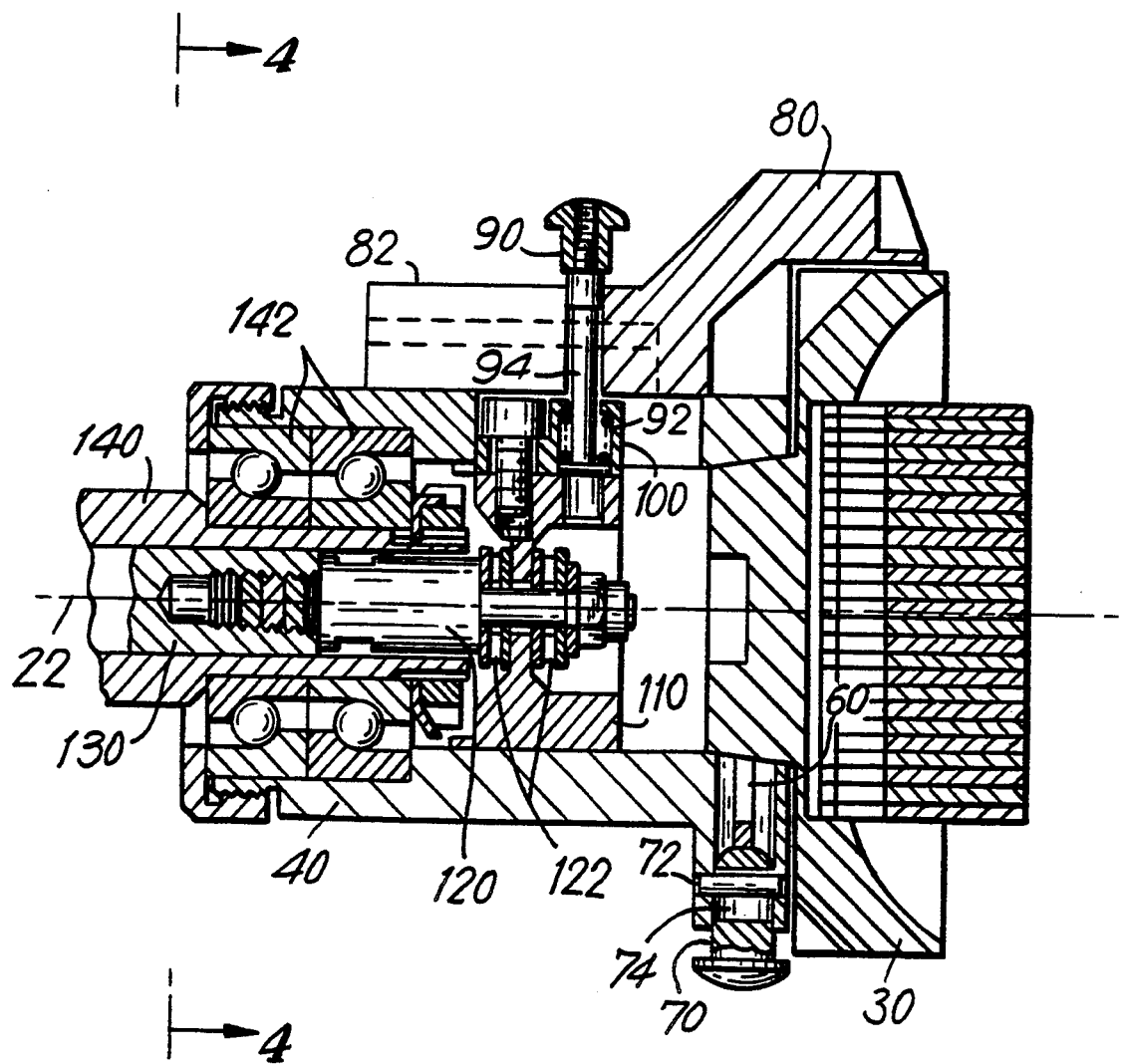
FIG. 3 is a sectional view taken along the line 3—3 in FIG. 1.
Figure 4:
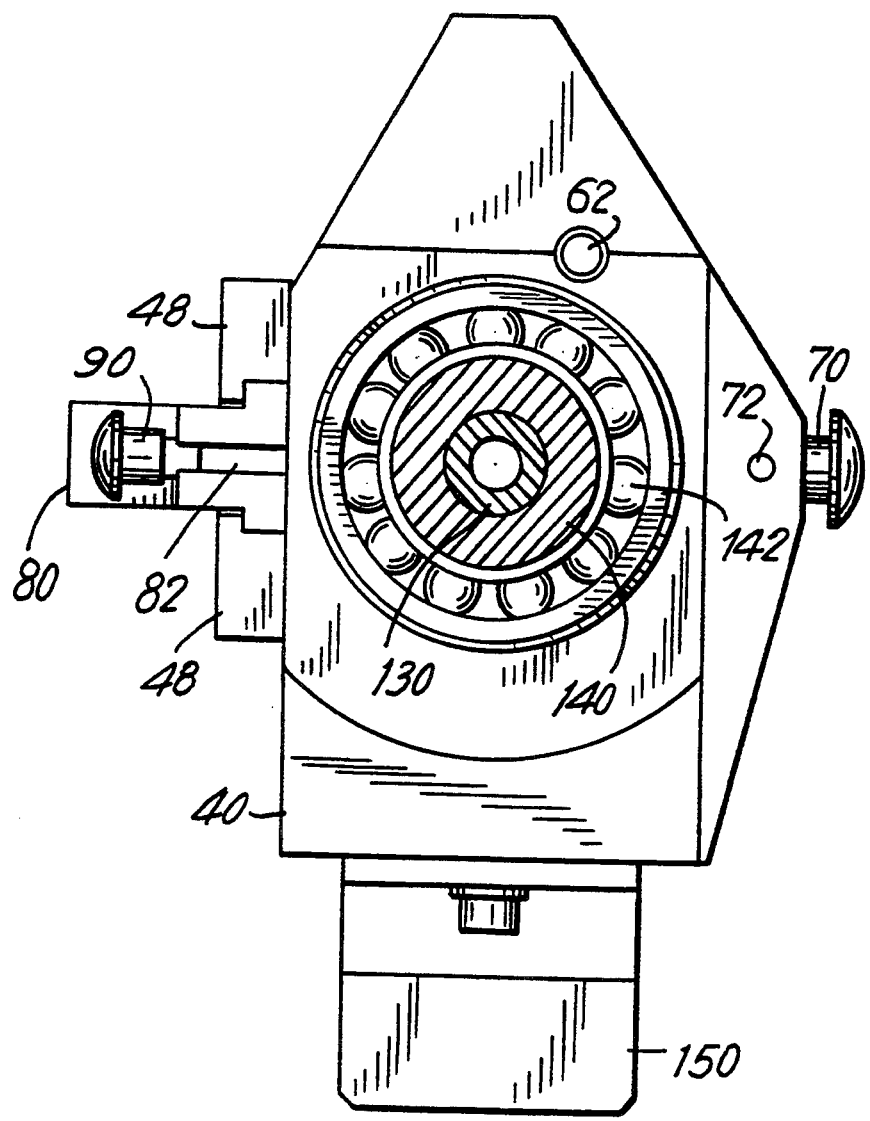
FIG. 4 is a sectional view taken along the line 4—4 in FIG. 3.

Pin 50 is normally urged downwardly into recess 34 by prestressed compression coil spring 52 which acts between a shoulder on pin 50 and a hollow annular tap 46 which is threaded into the upper part of support body 40 in which pin 50 reciprocates. The lower part of pin 50 includes a transverse aperture 54 and smaller pin 56 transverse to both the longitudinal axis of pin 50 and to aperture 54. As best seen in FIG. 2, the upper end of bell crank member 60 extends into aperture 54 under pin 56. Push button 70 acts on the other end of bell crank 60. Bell crank 60 pivots about pin 62. Push button 70 is captured by pin 72 which passes through an elongated aperture 74 in the stem of the push button. Accordingly, when push button 70 is pushed in, bell crank 60 lifts pin 50 out of recess 34. This allows shroud 30 to be pulled off the front of the associated support body 40 (assuming, of course, that no armature is present in the machine). A new shroud can then be placed on the machine. Whenever push button 70 is released, all of elements 50, 60, and 70 return to the positions shown in the drawings. When no shroud is present on support body 40, pin 72 stops the outward motion of push button 70 and therefore the downward motion of pin 50. On the other hand, when a shroud is present, the various elements are preferably sized and located so that pin 50 contacts aperture 34 before push button 70 is stopped by pin 72. In this way spring 52 is resiliently urging pin 50 into aperture 34 at all times, thereby continually urging projection 32 to remain seated in aperture 42. The mating surfaces of elements 32 and 42 therefore comprise mating reference surfaces for properly locating shroud 30 relative to support body 40, while elements 34 and 50 provide mating camming surfaces for camming the above-mentioned reference surfaces into firm contact with one another.

It will be seen from the foregoing that shroud 30 can be removed and replaced merely by pushing button 70. Yet while a shroud 30 is in position on support body 40 the shroud is held firmly and precisely relative to the support body.

Although not shown in FIGS. 1 and 2, the armature winding apparatus may also include a longitudinal reciprocating hooking plate 80 (FIGS. 3 and 4) which may be required for operations which are carried out when the armature coil leads are attached to the armature commutator hooks. Hooking plate 80 is typically advanced toward the commutator for lead attachment. Hooking plate 80 has a portion for guiding the coil leads so that these can be wrapped about a required tang without catching on an adjacent one. It may be necessary to change hooking plate 80 when different armatures are to be wound, and the apparatus of this invention also provides for easy, rapid, and tool-less changing of hooking plate 80 after shroud 30 has been removed and before a new shroud has been mounted as described above. The structure which facilitates changing of hooking plate 80 will now be described.

Hooking plate 80 is mounted for longitudinal reciprocation parallel to axis 22 by blocks 48 (FIG. 4) which are attached to one side of support body 40 and which form a guideway for the enlarged base of the hooking plate. Hooking plate 80 is reciprocated by pin 90 which passes through the enlarged portion of a keyhole-shaped slot 82 in the hooking plate and into block 100. Pin 90 is biased inwardly toward block 100 by a prestressed compression coil spring 92 which acts between a flange on the end of pin 90 and a flange on block 100. A portion of pin 90 remote from spring 92 is too large to pass through the relatively narrow portion of keyhole-shaped slot 82, although it does fit in the enlarged portion of that slot. Accordingly, pin 90 normally causes hooking plate 80 to reciprocate with block 100 parallel to axis 22.

When it is desired to change hooking plate 80 (i.e., while no shroud 30 is on the machine), pin 90 can be pulled out a short distance so that a thinner portion 94 of the pin is aligned with the narrower portion of keyhole-shaped slot 82. Portion 94 of pin 90 is thin enough to pass along the thinner portion of slot 82. Accordingly, when pin 90 is pulled out, hooking member 80 can be slipped (in the direction parallel to axis 22 toward the absent shroud 30) all the way out of the guideway between blocks 48. If desired, a new hooking member 80 can be placed on the machine by reversing the foregoing operations.

To explain the remainder of the depicted apparatus, block 100 is bolted to cup-shaped member 110. Member 110 is connected to member 120 by thrust bearings 122 which couple reciprocating (but not rotational) motion of member 120 to member 110. Member 120 is connected to member 130 which is capable of reciprocating.

Member 140 rotates about axis 22 to rotate flyer 20. The end of member 140 also provides support for support body 40 via bearings 142. Weight 150 helps prevent support body 40 from rotating with member 140.

Among the advantages of the embodiment shown in FIGS. 1–4 are the fact that the counterweight 150 is part of the support body assembly and not part of the shroud assembly. This reduces the cost, size, and weight of the interchangeable part of the apparatus (i.e., the shrouds). Another possible advantage of this embodiment is that the hooking plate structure is also not part of the shroud assembly, which further reduces the cost, size, and weight of the shroud assemblies.

Figure 5:
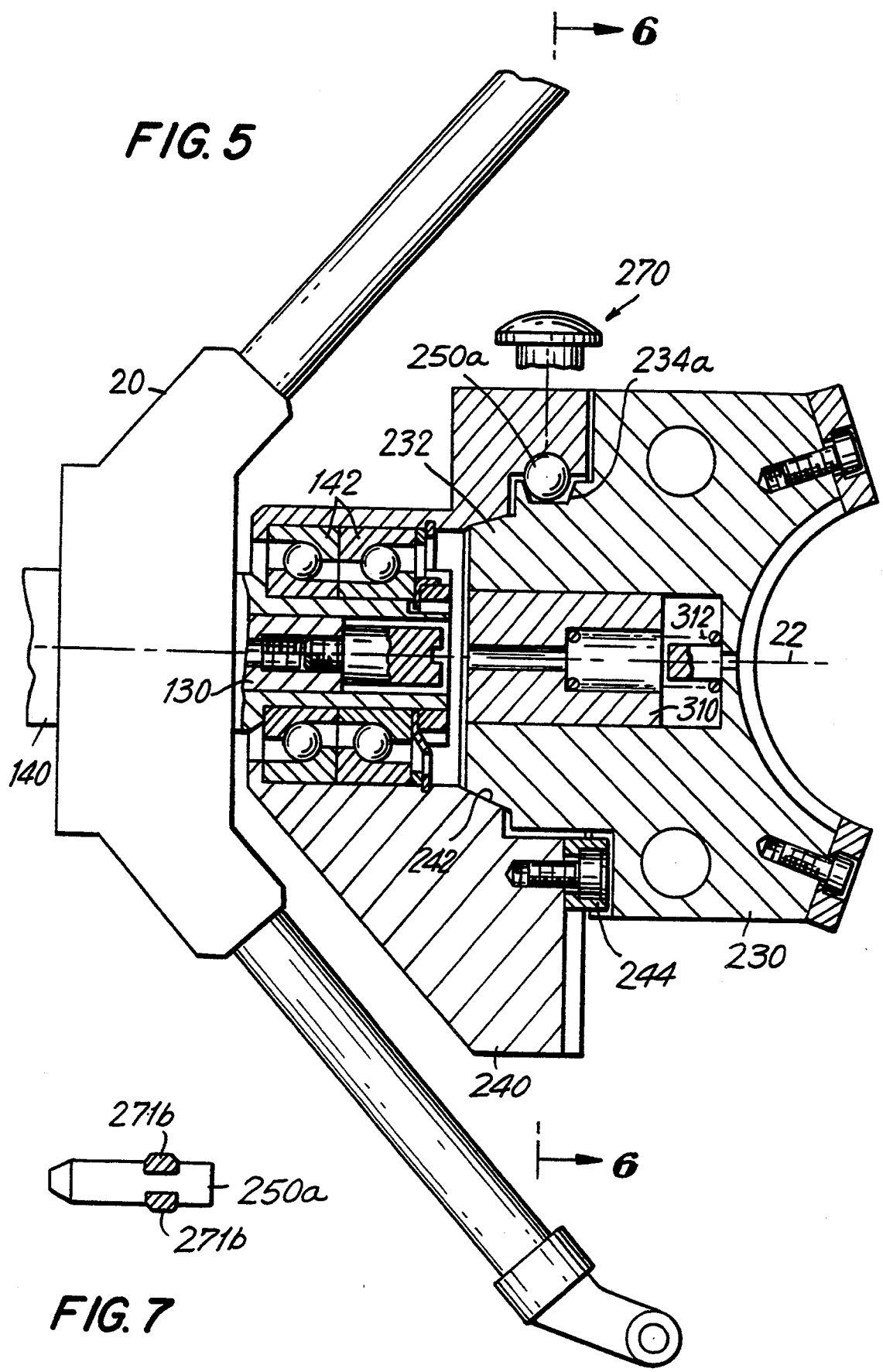
FIG. 5 is a view generally similar to FIG. 1 showing a second illustrative embodiment of the invention. The sectional portions of FIG. 5 in the vicinity of line 6—6 are taken along the line 5—5 in FIG. 6. Elsewhere the sectional portions of FIG. 5 are a straight vertical section.
Figure 6:
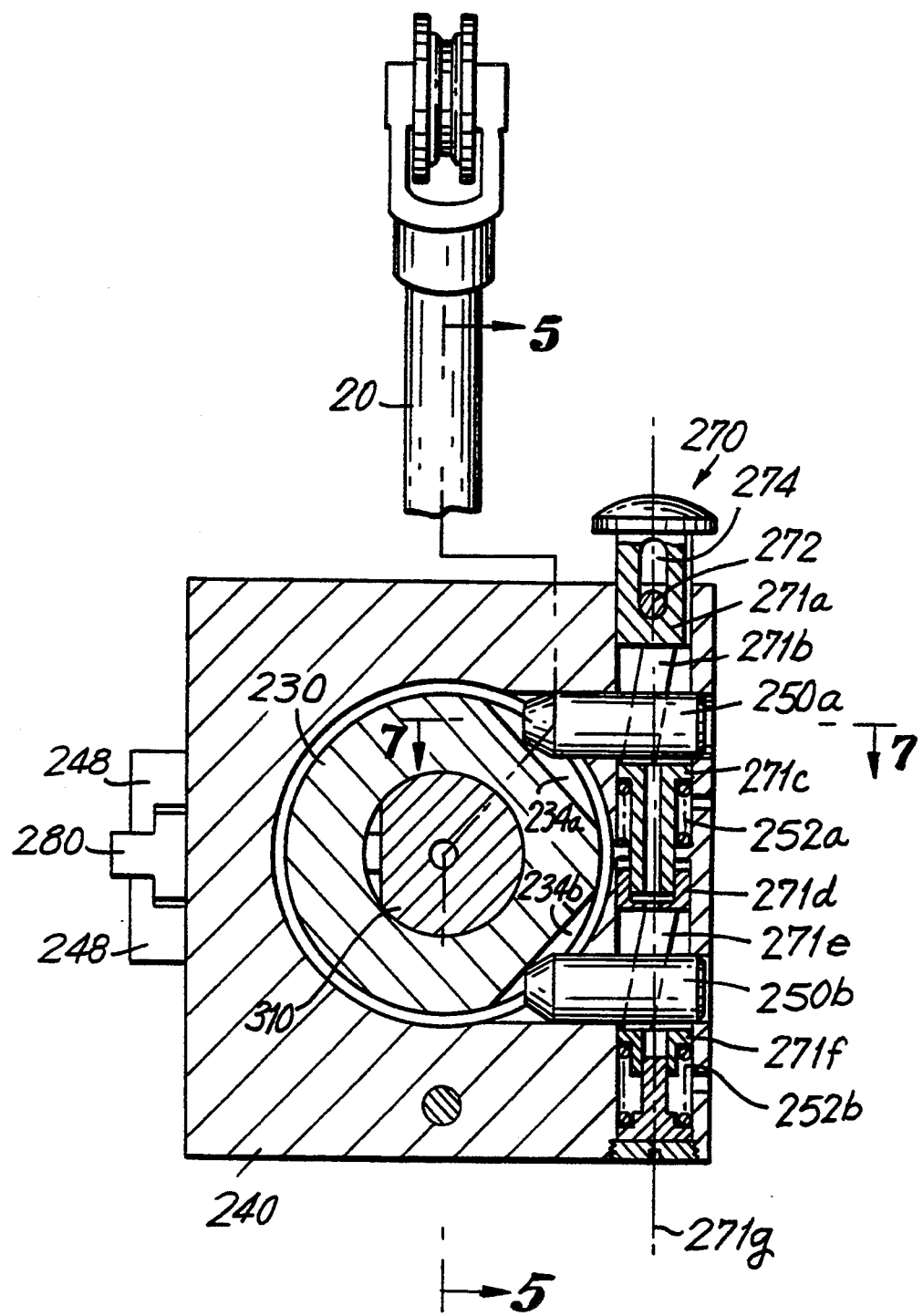
FIG. 6 is a sectional view taken along the line 6—6 in FIG. 5.

FIGS. 5–7 show an alternative embodiment of shroud mounting apparatus in accordance with this invention. The same reference numbers are used throughout FIGS. 1–7 for elements which are the same or substantially the same. Elements which are generally similar to elements in FIGS. 1–4 have reference numbers which are increased by 200 in FIGS. 5–7. Shroud 230 has a frustoconical projection 232 which is snugly received in complementary recess 242 in support body 240 when the shroud is mounted on the armature winding machine. Shroud 230 is prevented from rotating about axis 22 relative to support body 240 by pin 244 which projects from support body 240 into a slot or aperture in shroud 230. Shroud 230 is releasably secured to support body 240 by the frustoconical ends of the pins 250a and 250b which extend from support body 240 into channels 234a and 234b, respectively, in shroud 230. Pins 250 can be retracted out of channels 234 by depressing pin 270 as will now be described.

Pin 270 includes a linear array of elements 271a–f which generally move together parallel to axis 271g. The elements in this array are urged upwardly as viewed in FIG. 6 by prestressed compression coil springs 252a and 252b. The upward motion of elements 271 is limited by pin 272 in elongated slot 274. All of elements 271 can be pushed down by pushing down on the button at the upper end of the array. Elements 271b and 271e are bifurcated or yoke-like (see FIG. 7). Elements 271b and 271e are inclined relative to axis 271g and pass through similarly inclined slots in the sides of pins 250a and 250b. (For stability, each of elements 271b and 271e may be integral with the element above or below it in the array of elements 271.) Accordingly, when elements 271 are depressed, elements 271b and 271e retract pins 250 from channels 234. When elements 271 are no longer being depressed, elements 271b and 271e re-extend pins 250 into channels 234. Note that the frustoconical ends of pins 250 bear on the inclined surfaces of channels 234 which are remote from the intended location of an armature. Accordingly, pins 250 urge shroud projection 232 into firm contact with support body recess 242. This action of pins 250 is resilient due to the resilience of springs 252. Hooking plate 280 may be mounted on one side of support body 240 in a manner generally similar to FIGS. 1–4. In this embodiment, however, the actuator 310 for hooking plate 280 is part of shroud 230. Actuator 310 is resiliently urged to the left as viewed in FIG. 5 by prestressed compression coil spring 312. Actuator 310 can be pushed to the right by rightward movement of member 130.

Figure 8:
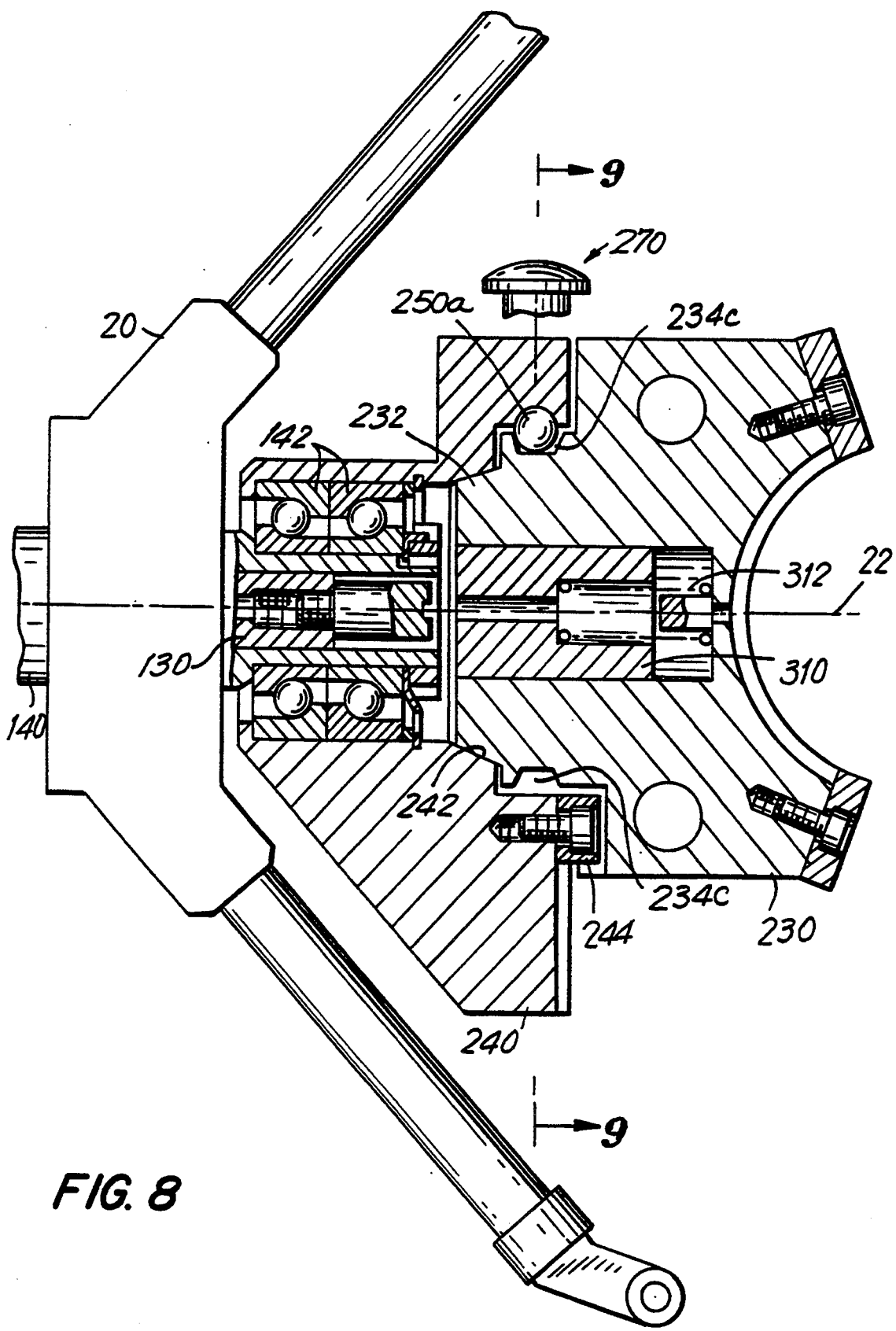
FIG. 8 is another view generally similar to FIG. 1 showing a third illustrative embodiment of the invention. The sectional portions of FIG. 8 in the vicinity of line 9—9 are taken along the line 8—8 in FIG. 9. Elsewhere the sectional portions of FIG. 8 are a straight vertical section.
Figure 9:
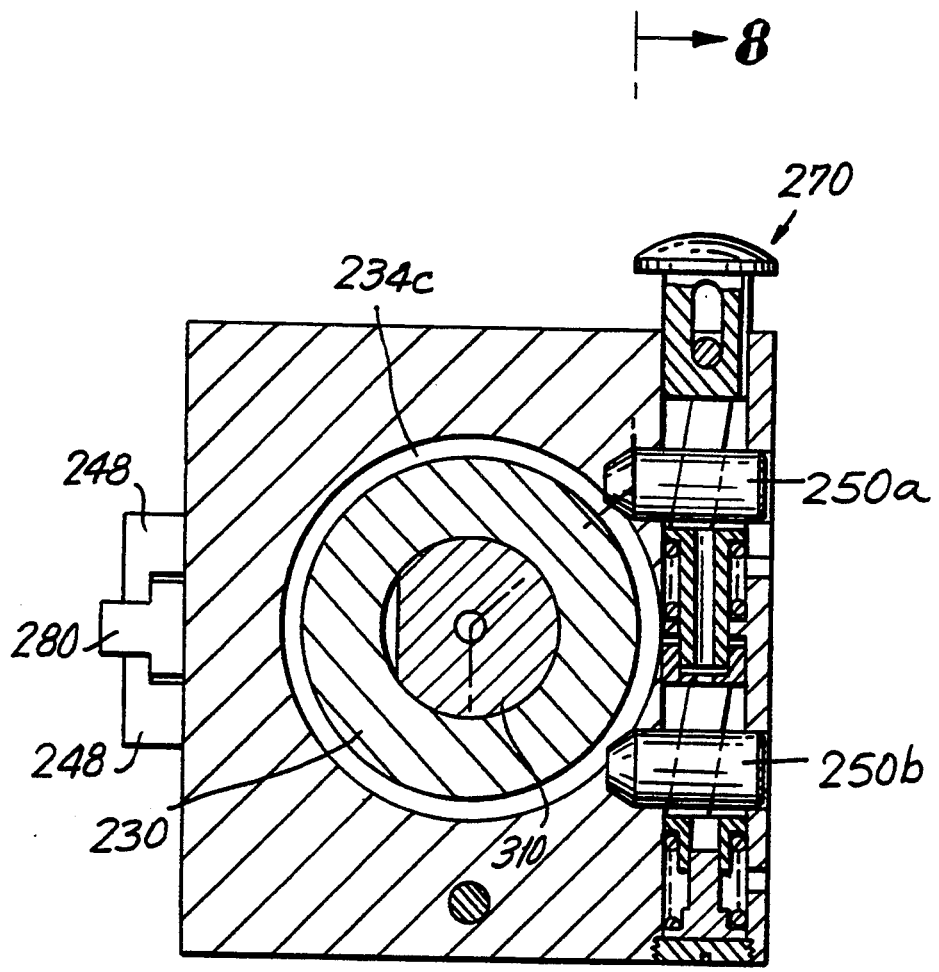
FIG. 9 is a sectional view taken along the line 9—9 in FIG. 8.

FIGS. 8 and 9 show another alternative embodiment which is generally similar to the embodiment shown in FIGS. 5–7. The difference between these embodiments is that instead of two chord-like channels 234a and 234b, the embodiment of FIGS. 8 and 9 has a single annular channel 234c for receiving the frustoconical ends of pins 250.

The embodiments of FIG. 5–9 have the advantage that the counterweight is on the support body, which as has been mentioned in connection with FIGS. 1–4, reduces the cost, size, and weight of the interchangeable shrouds. In contrast to FIGS. 1–4, however, in the embodiments of FIGS. 5–9 the hooking plate is part of the shroud assembly, so that the hooking plate is automatically changed wherever the shroud is changed.

Figure 11:
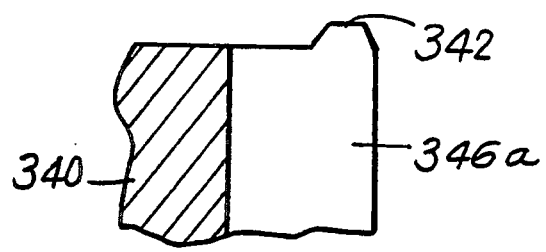
FIG. 11 is a partial sectional view taken along the line 11—11 in FIG. 10.
Figure 10:
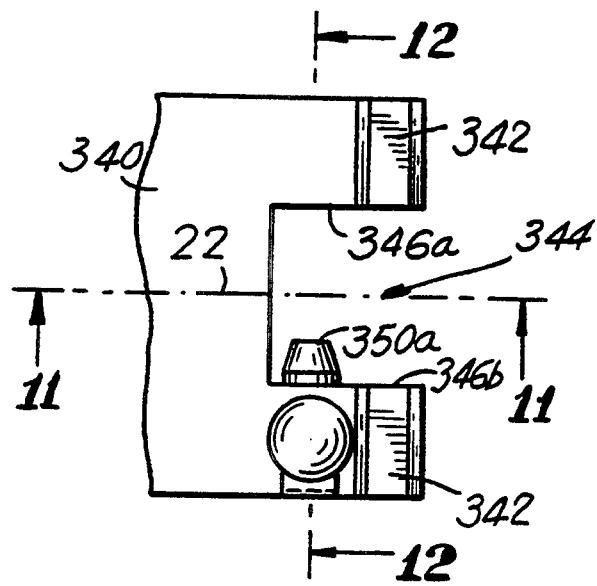
FIG. 10 is a partial plan view of a fourth illustrative embodiment of the invention.
Figure 12:
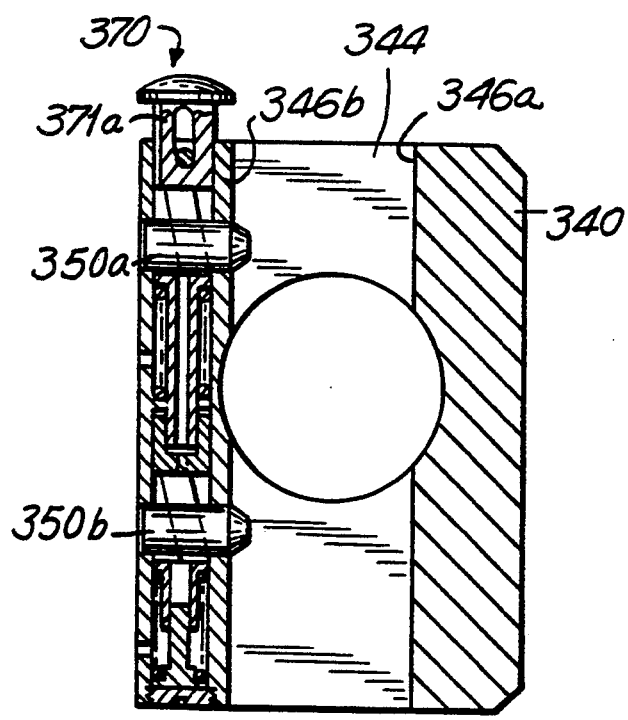
FIG. 12 is a partial sectional view taken along the line 12—12 in FIG. 10.

FIGS. 10–17 show another alternative embodiment in which shroud 330 essentially hangs from flanges 342 on support body 340, and in which releasable latches are used to ensure that shroud 340 remains in firm contact with flanges 342 except when the latches are intentionally released during changing of the shroud. FIGS. 10–12 show support body 340 with no shroud in place. Support body 340 has a vertical channel 344 between two arms 346a and 346b which extend toward the armature site. Near the armature site, the upper surface of each arm 346 has an upwardly projecting flange 342 with side surfaces which are synclinal in the upward direction. Arm 346b carries a releasable latch structure 370 which is very similar to the structure 270 in FIGS. 5–9 and which therefore need not be described again in detail. The frustoconical ends of the pins 350 of this latch structure normally extend resiliently into one side of channel 344, but can be retracted by pressing down on the topmost element 371a in the latch structure.

Figure 13:
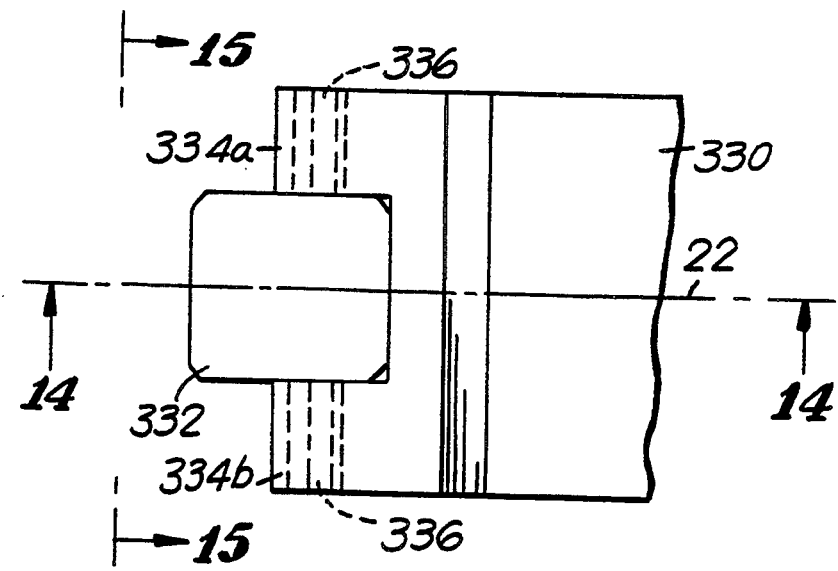
FIG. 13 is a partial plan view of another portion of the fourth illustrative embodiment of the invention.
Figure 14:
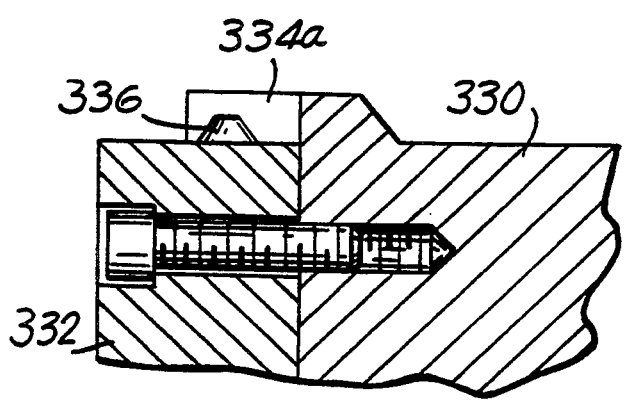
FIG. 14 is a partial sectional view taken along the line 14—14 in FIG. 13.
Figure 15:
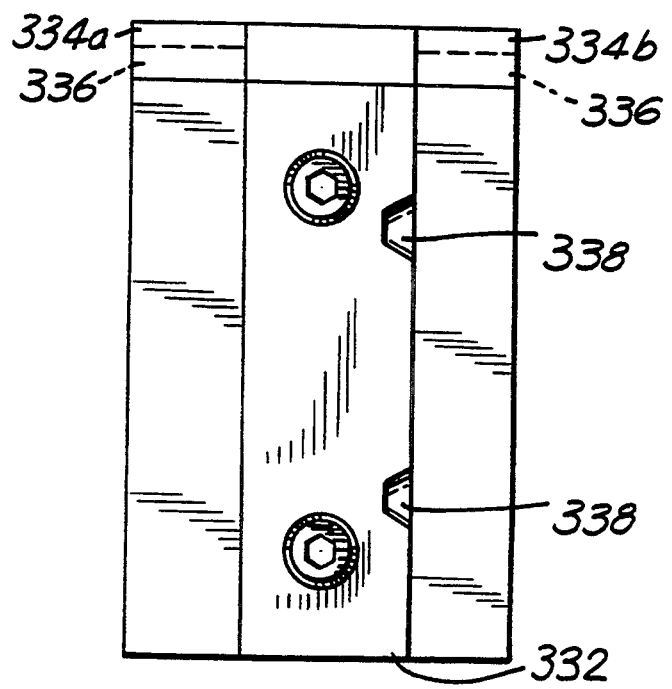
FIG. 15 is a partial elevational view taken along the line 15—15 in FIG. 13.

FIGS. 13–15 show just the portion of shroud 330 which mates with support body 340. Shroud 330 has a block 332 bolted to its near surface. When the shroud is on support body 340, block 332 fits snugly but removably into channel 344. Above and on each side of block 332 shroud 330 has a rearwardly projecting extension 334a and 334b. Each of extensions 334 has a downwardly opening channel 336 which receives a support body flange 342 when the shroud is mounted on the support body. The rear portion of the side of block 332 which is adjacent latch 370 when the shroud is on the support body has two laterally opening channels 338 which receive the frustoconical ends of pins 350.

Figure 16:
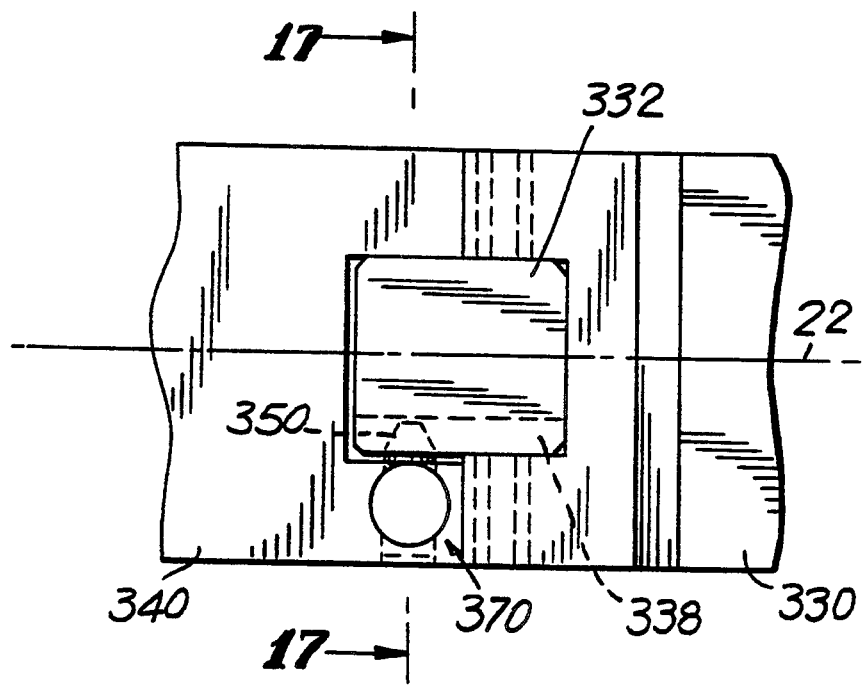
FIG. 16 is a partial plan view showing assembly of the elements shown in FIGS. 10 and 13.
Figure 17:
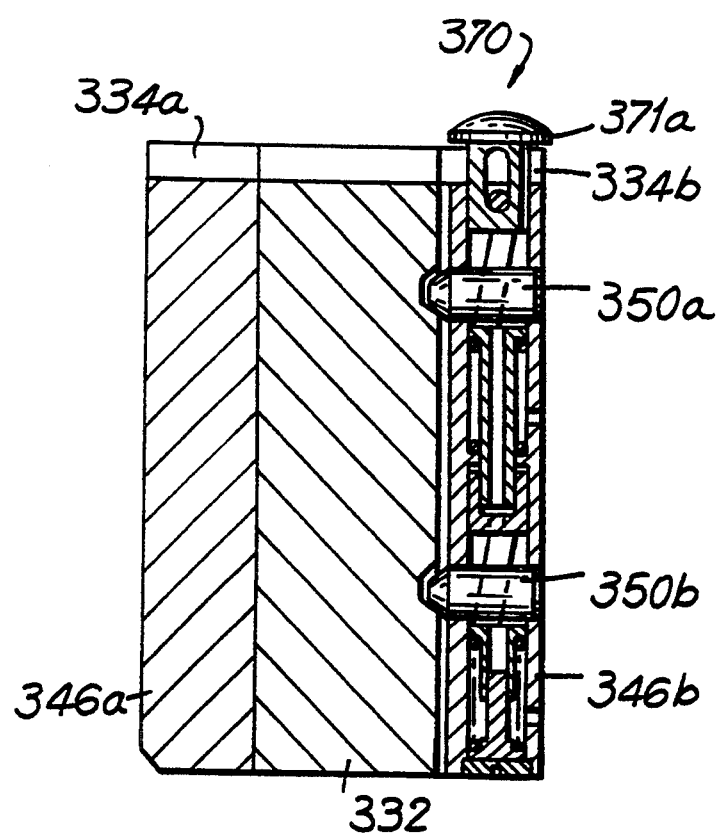
FIG. 17 is a partial sectional view taken along the line 17—17 in FIG. 16.

When shroud 330 is on support body 340 as shown in FIGS. 16 and 17, the rear surface of each channel 336 is positioned and inclined to cooperate with the inclined rear surface of the adjacent flange 342 so that the rear surface of shroud 330 bears against the front surfaces of support body arms 346. This aligns shroud 330 with the front face of the support body. The presence of block 332 in channel 344 prevents the shroud from rotating relative to support body 340 about axis 22. Channels 338 are preferably somewhat nonconcentric with pins 350 so that the lower surfaces of the frustoconical ends of pins 350 bear on the inclined lower side walls of channels 338 and thereby urge shroud 330 downward relative to support body 340. This helps ensure that projections 334 remain seated on flanges 342 and that the rear surface of shroud 330 remains in good contact with the front surfaces of support body arms 346.

When it is desired to change shroud 330, the topmost element 371a of latch assembly 370 is depressed, thereby retracting pins 350. Shroud 330 can then be lifted off flanges 342 and removed. Another shroud can be placed on the apparatus by reversing this procedure.

Figure 18:
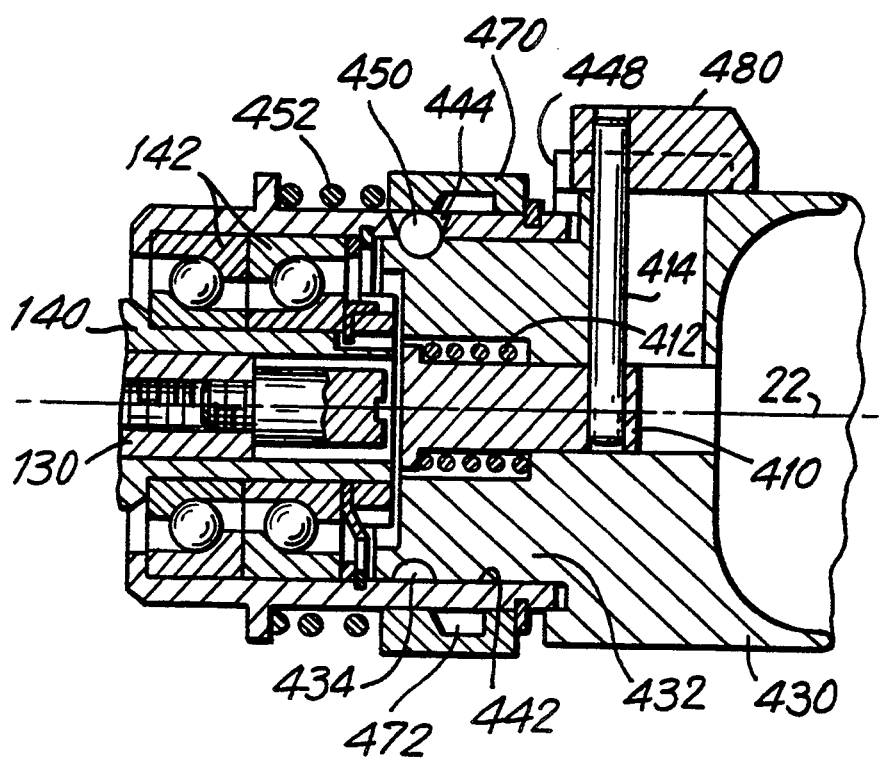
FIG. 18 is a partial horizontal sectional view of a fifth illustrative embodiment of the invention.

FIG. 18 shows another alternative embodiment. In this embodiment shroud 430 has a cylindrical rearward projection 432 which fits snugly but removably into a cylindrical aperture 442 in support body 440. Shroud 430 is held in position on support body 440 by one or more balls 450 which are disposed in one or more apertures 444 in the wall of support body 440 which surrounds aperture 442. Balls 450 are forced to project from apertures 444 into an annular recess 434 in the rear of the cylindrical surface of projection 432 by annular sleeve 470 when sleeve 470 is in the forward position shown in FIG. 18. Sleeve 470 is resiliently urged toward the forward position by prestressed compression coil spring 452. When it is desired to remove shroud 430, sleeve 470 is moved rearwardly until annular recess in sleeve 470 is adjacent balls 450. This allows balls 450 to retract out of recess 434, thereby allowing shroud 430 to be pulled out of support body 440. A new shroud can be mounted on the support body by reversing the foregoing procedure.

In the embodiment shown in FIG. 18 hooking plate 480 is mounted and operated in generally the same way that the hooking plate is mounted and operated in FIGS. 5-9. Thus when member 130 is extended, it contacts the rear end of member 410 and pushes it toward the armature site. The motion of member 410 is transferred to hooking plate 480 by linking pin or bar 414. Member 410 is resiliently biased toward the rear of shroud 430 by prestressed compression coil spring 412. As in FIGS. 5-9 hooking plate 480 is mounted on shroud 430 and is therefore changed each time shroud 430 is changed. Also as in several of the previously discussed embodiments the counterweight in FIG. 18 is on the support body rather than on the interchangeable shrouds, thereby reducing the cost, size, and weight of the shrouds.

Figure 19:
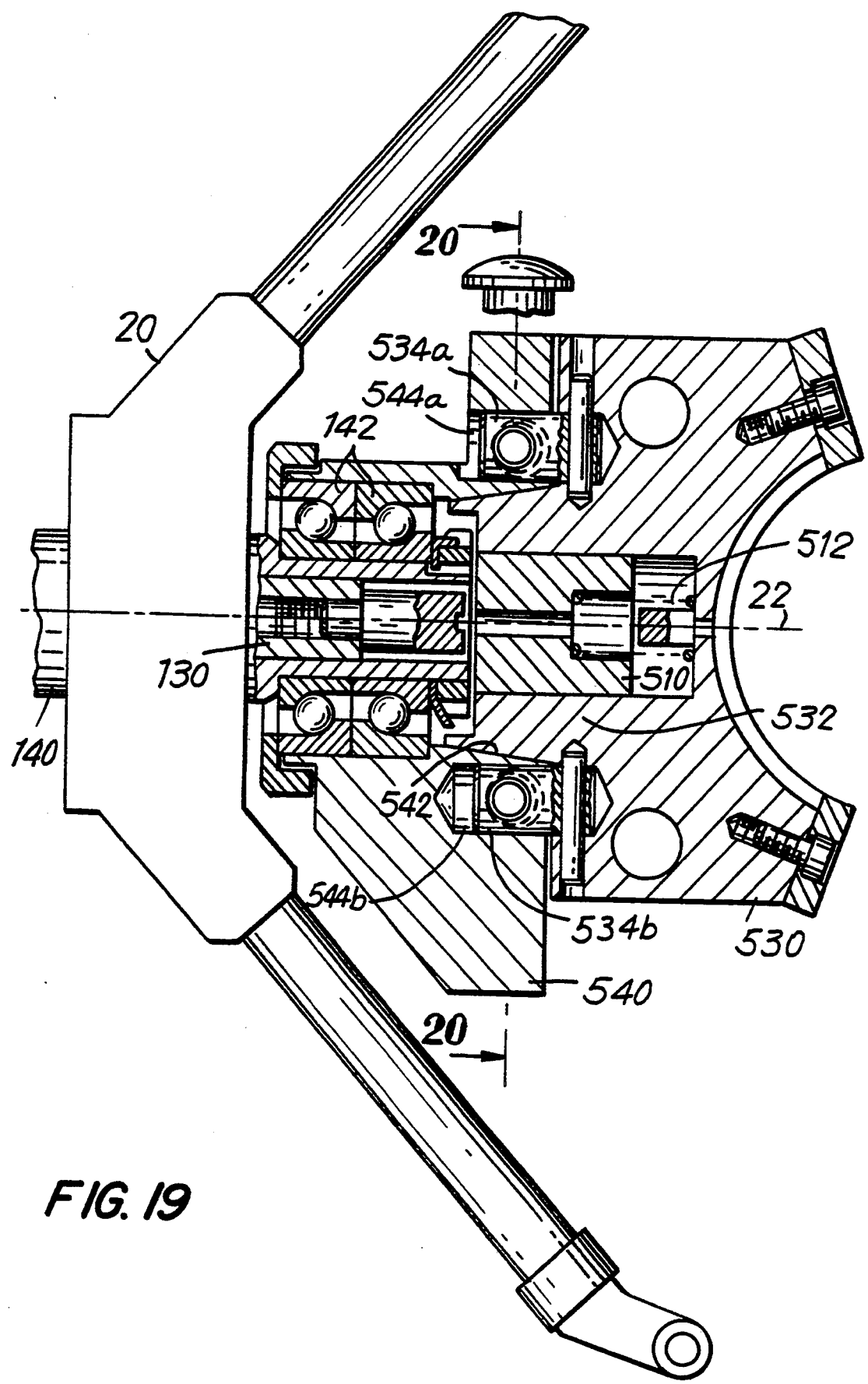
FIG. 19 is a view generally similar to FIG. 1 showing a sixth illustrative embodiment of the invention.
Figure 20:
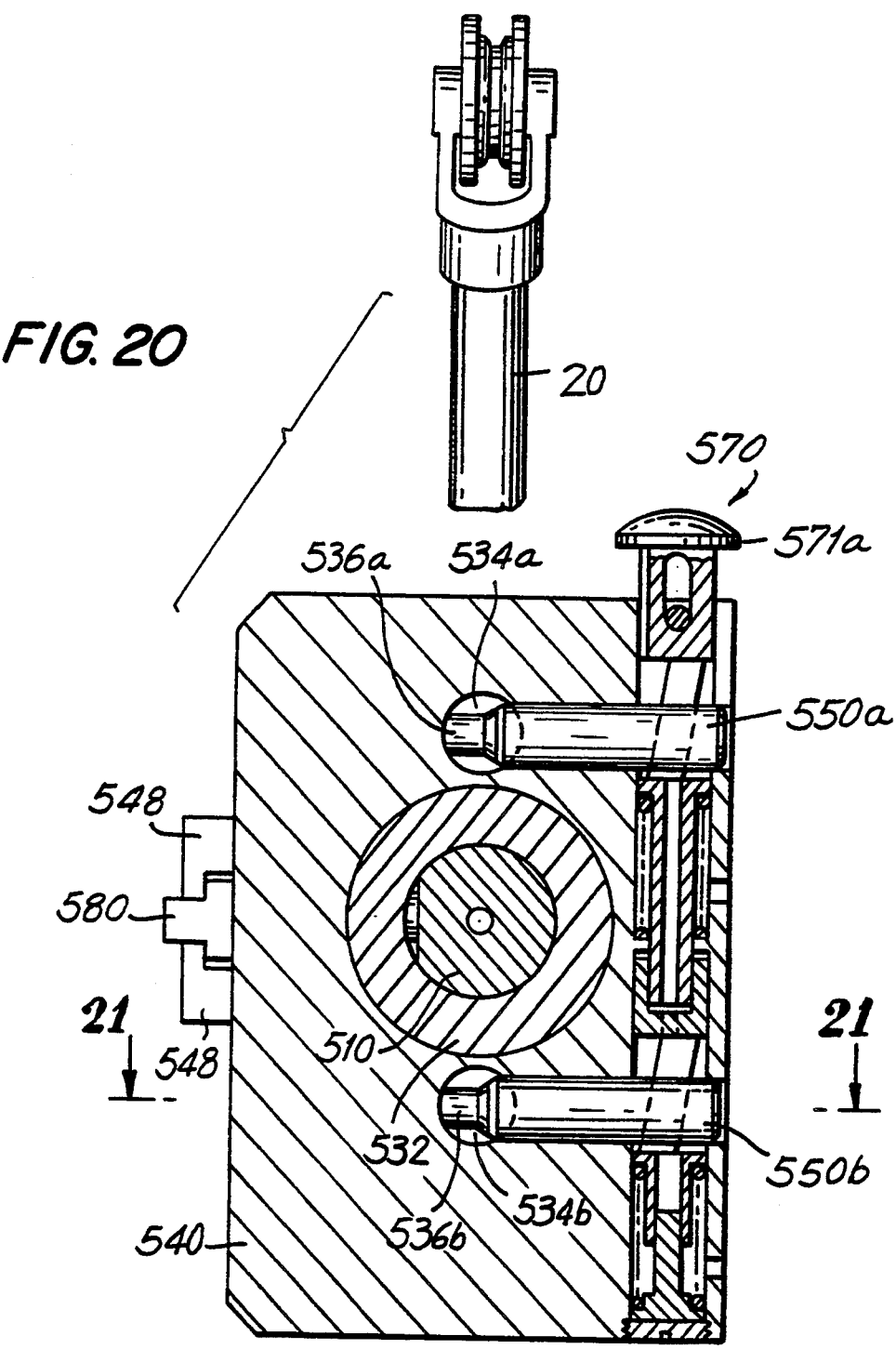
FIG. 20 is a sectional view taken along the line 20—20 in FIG. 19.
Figure 21:
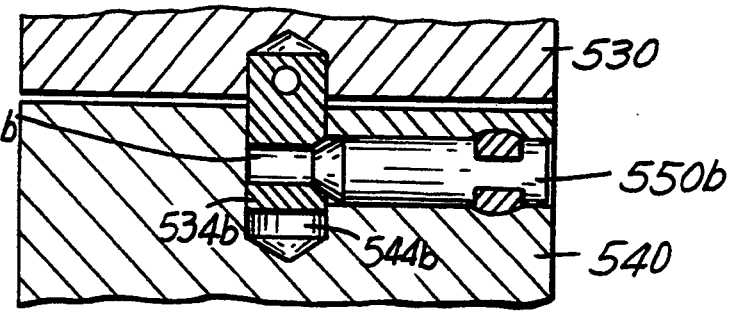
FIG. 21 is a partial sectional view taken along the line 21—21 in FIG. 20.

In the embodiment shown in FIGS. 19-21 frustoconical projection 532 on the rear of shroud 530 fits in a complementary recess 542 in support body 540. In addition, two pins 534a and 534b project from the rear of shroud 530 into apertures 544a and 544b in support body 540. Each of pins 534 has a transverse aperture 536. The frustoconical end of a pin 550 extends into the aperture 536 in each pin 534 in order to keep projection 532 seated in aperture 542. Pins 550 are operated by a control mechanism 570 similar to the control mechanism 270 described above in connection with FIGS. 5-7. Accordingly, when the topmost element 571a in this control mechanism is depressed, the ends of pins 550 are withdrawn from apertures 536 and shroud 530 can then be removed from support body 540. Note that apertures 536 are not concentric with pins 550 so that the inclined rear surface of the ends of pins 550 bear on the similarly inclined rear portion of apertures 536. In this way pins 550 constantly urge shroud projection 532 into firm seating relationship with support body aperture 542 except when control 570 is operated to retract pins 550.

Hooking plate 580 is mounted and operated in this embodiment in substantially the same way that hooking plate 280 is supported and operated in the embodiment shown in FIGS. 5-7. Also the counterweight is again mounted on the support body to reduce the cost, size, and weight of the shrouds.

Figure 22:
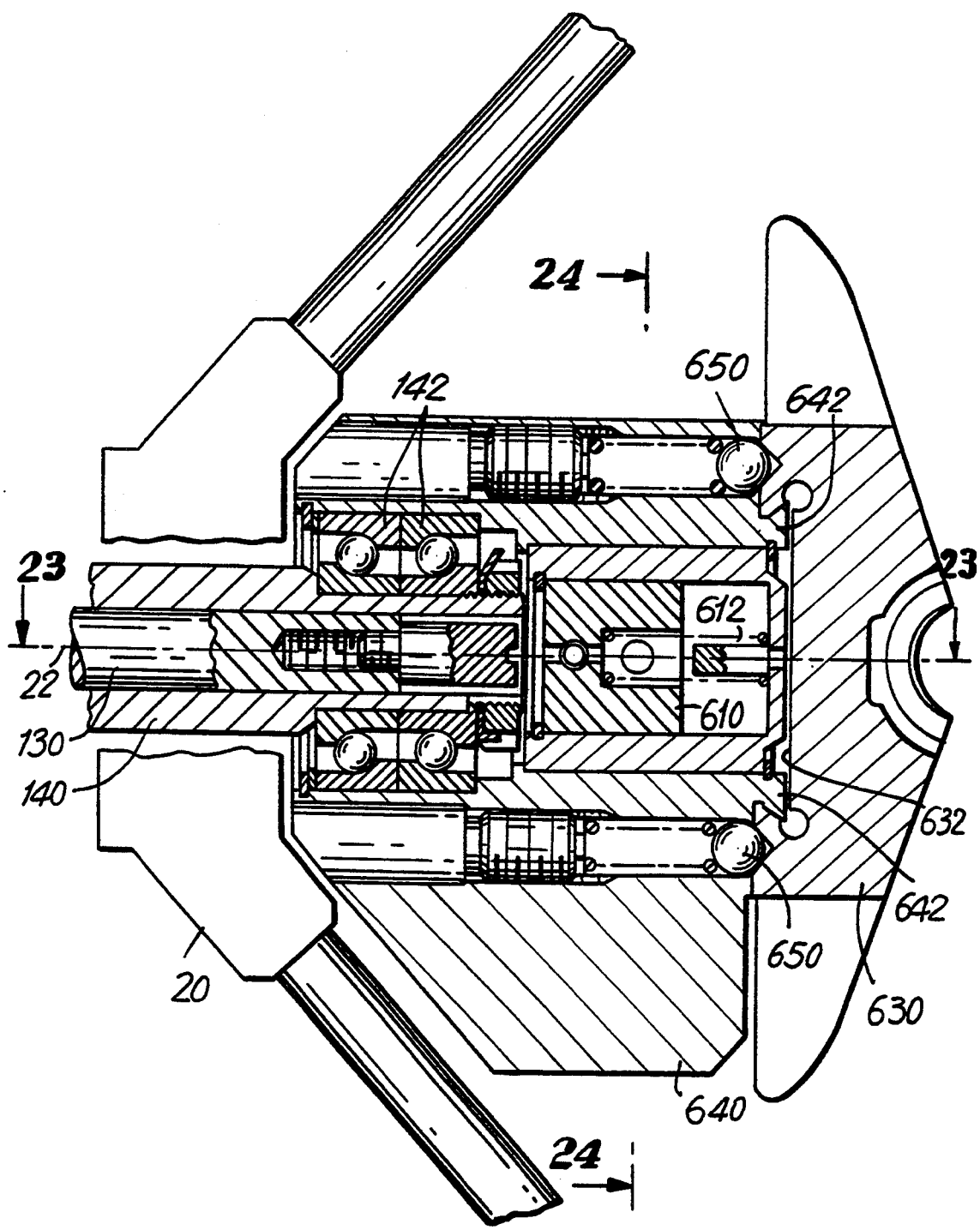
FIG. 22 is a view generally similar to FIG. 1 showing a seventh illustrative embodiment of the invention.
Figure 23:
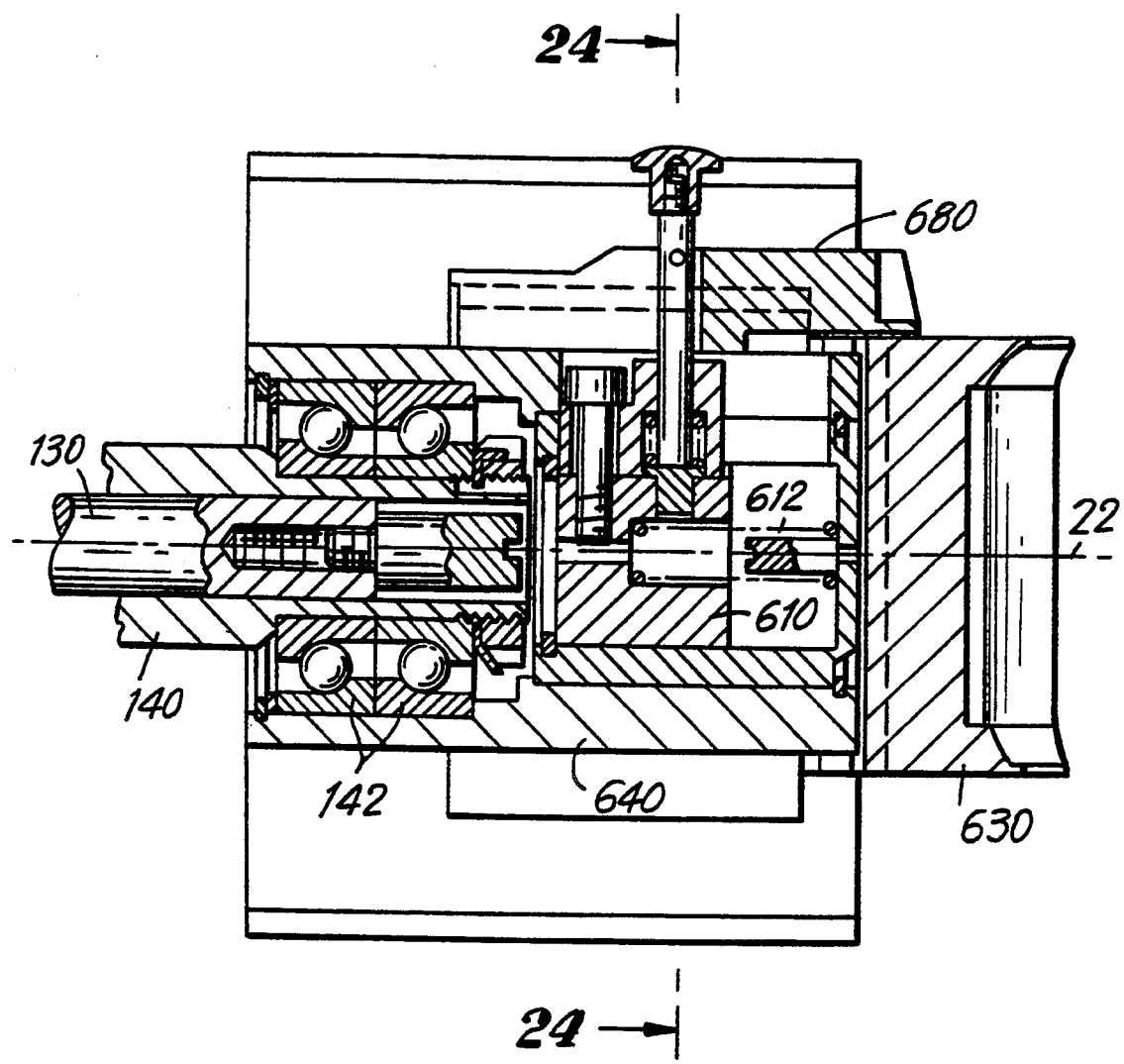
FIG. 23 is a sectional view taken along the line 23—23 in FIG. 22.
Figure 24:
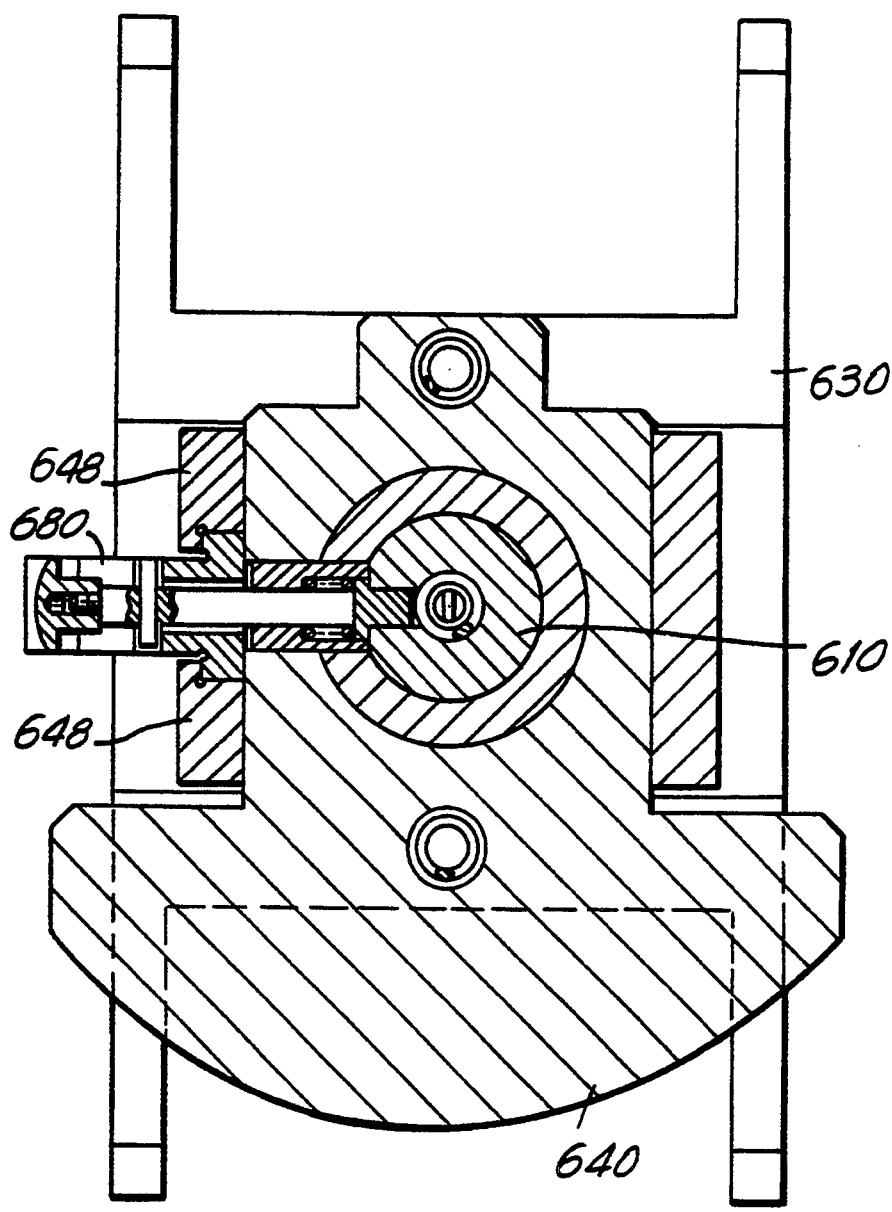
FIG. 24 is a sectional view taken along the line 24—24 in FIGS. 22 and 23.
Figure 25:
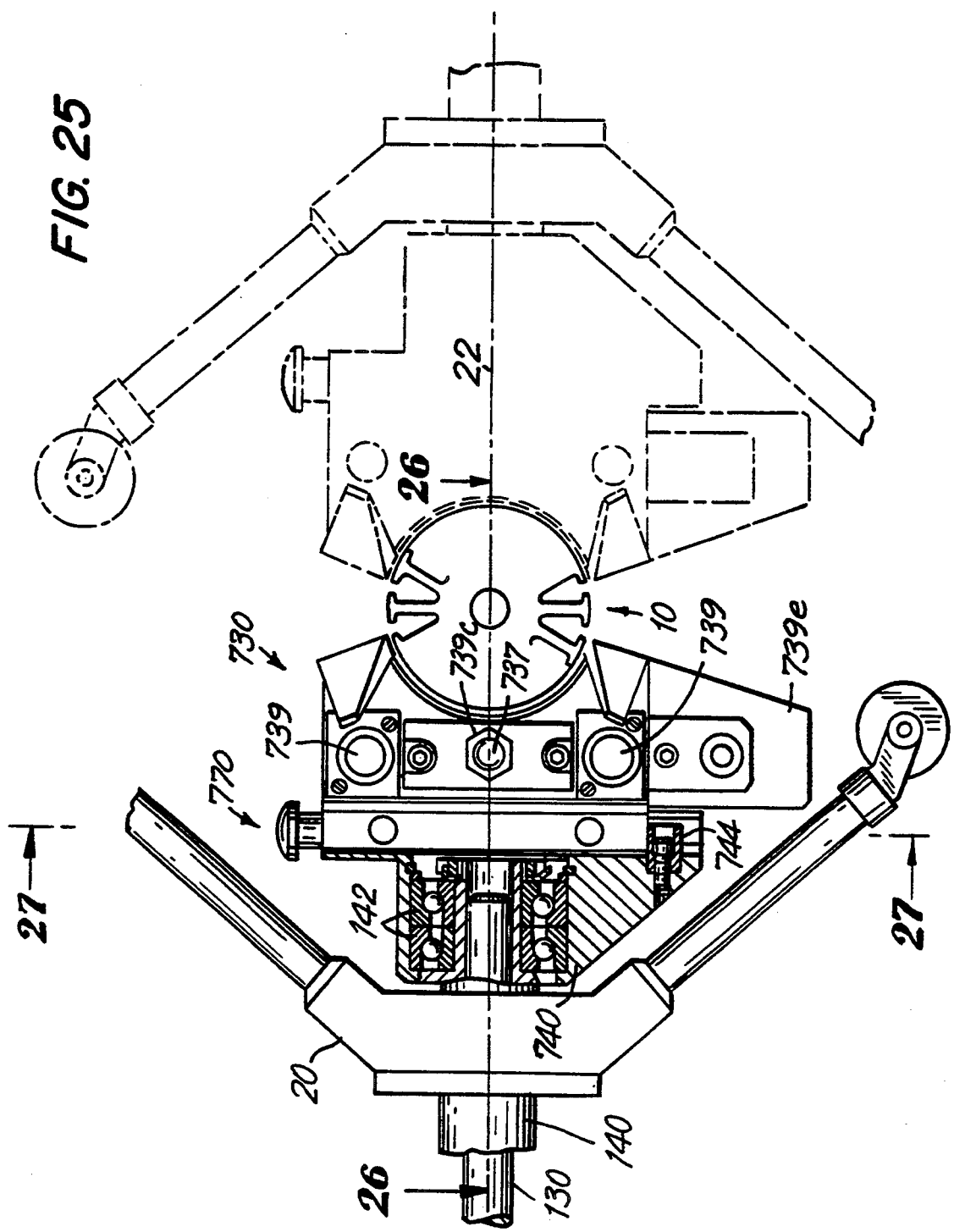
FIG. 25 is a view generally similar to FIG. 1 showing an eighth embodiment of the invention.
Figure 26:
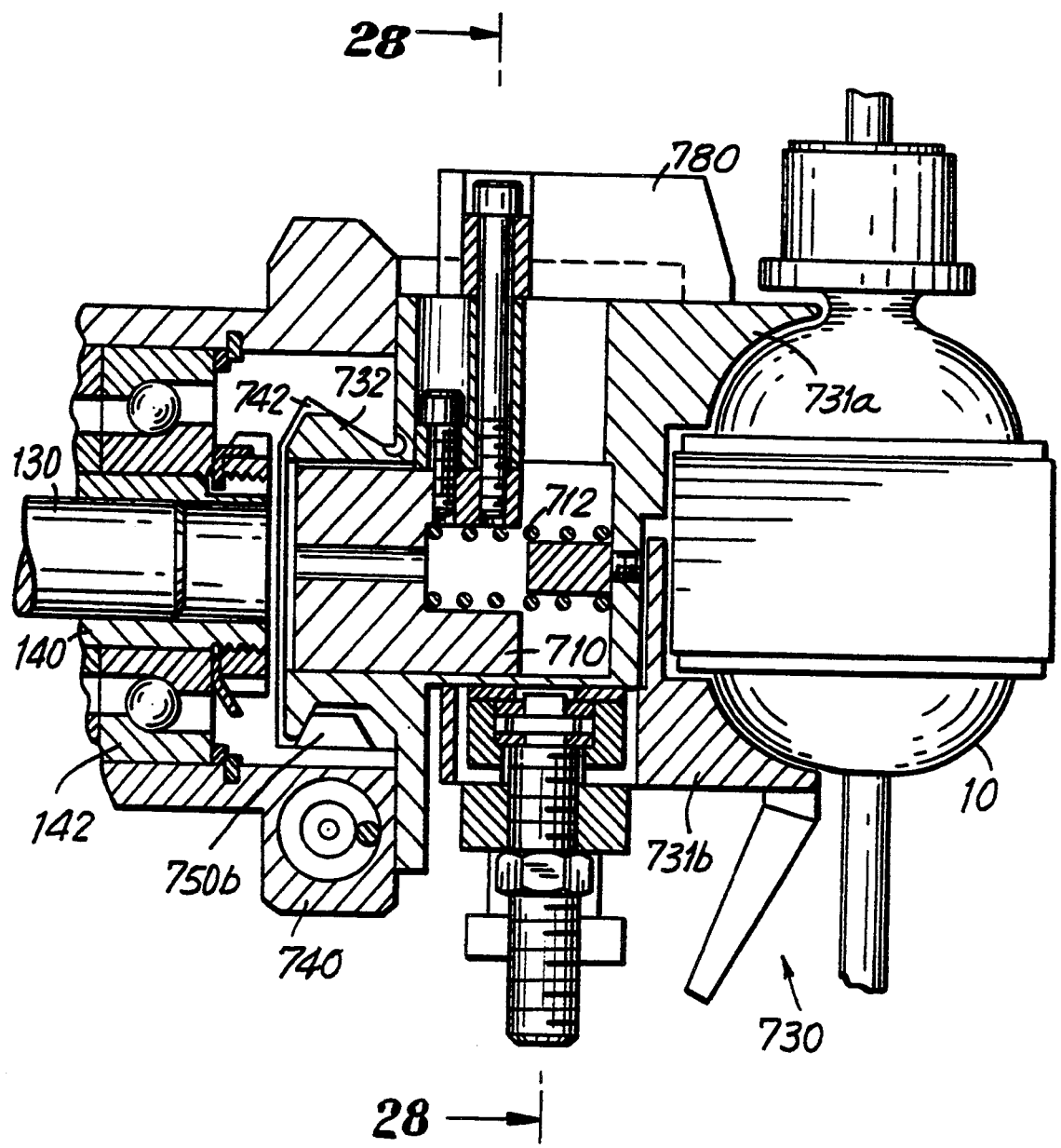
FIG. 26 is a sectional view taken along the line 26—26 in FIG. 25.
Figure 27:
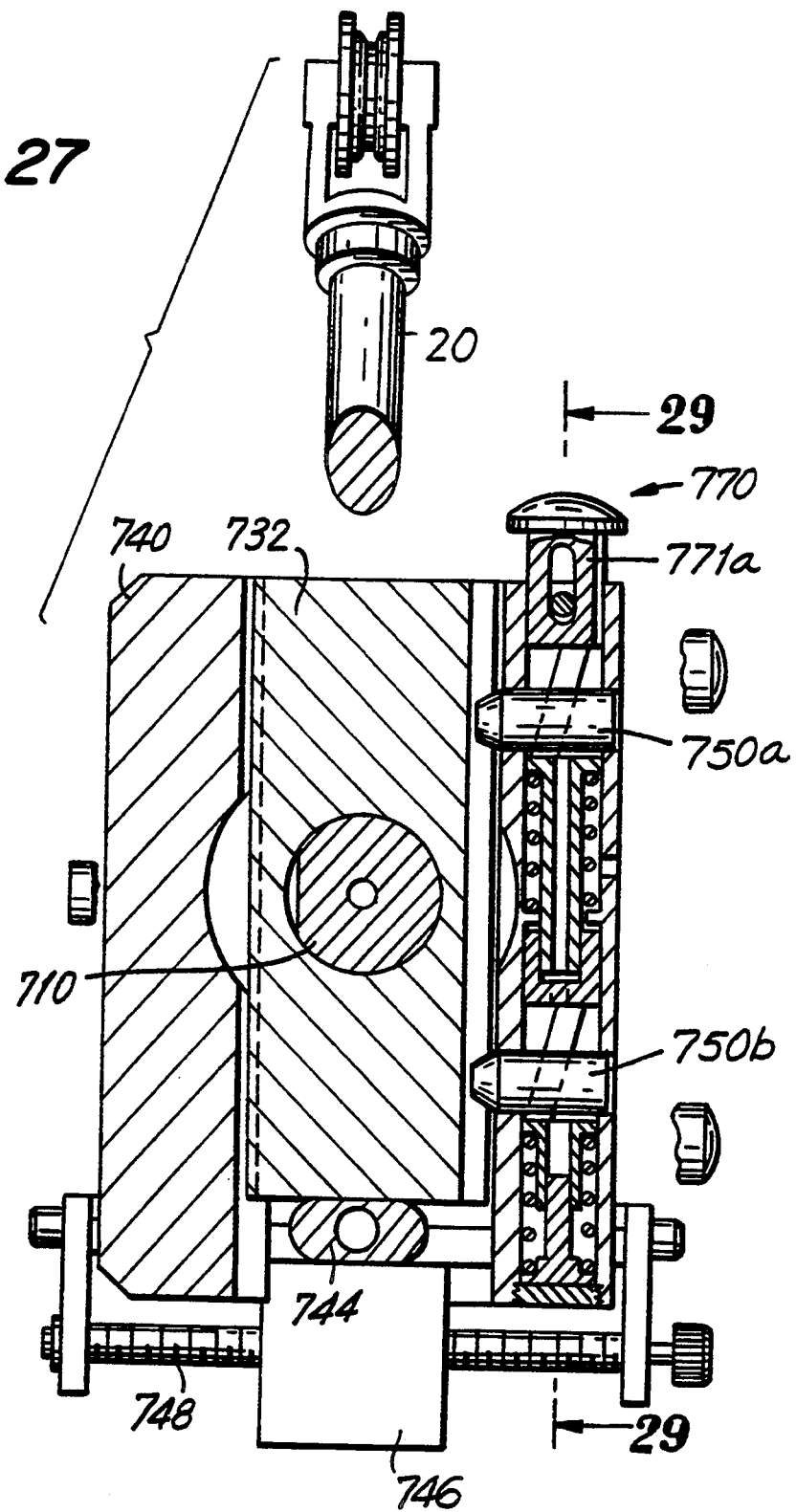
FIG. 27 is a sectional view taken along the line 27—27 in FIG. 25.
Figure 28:
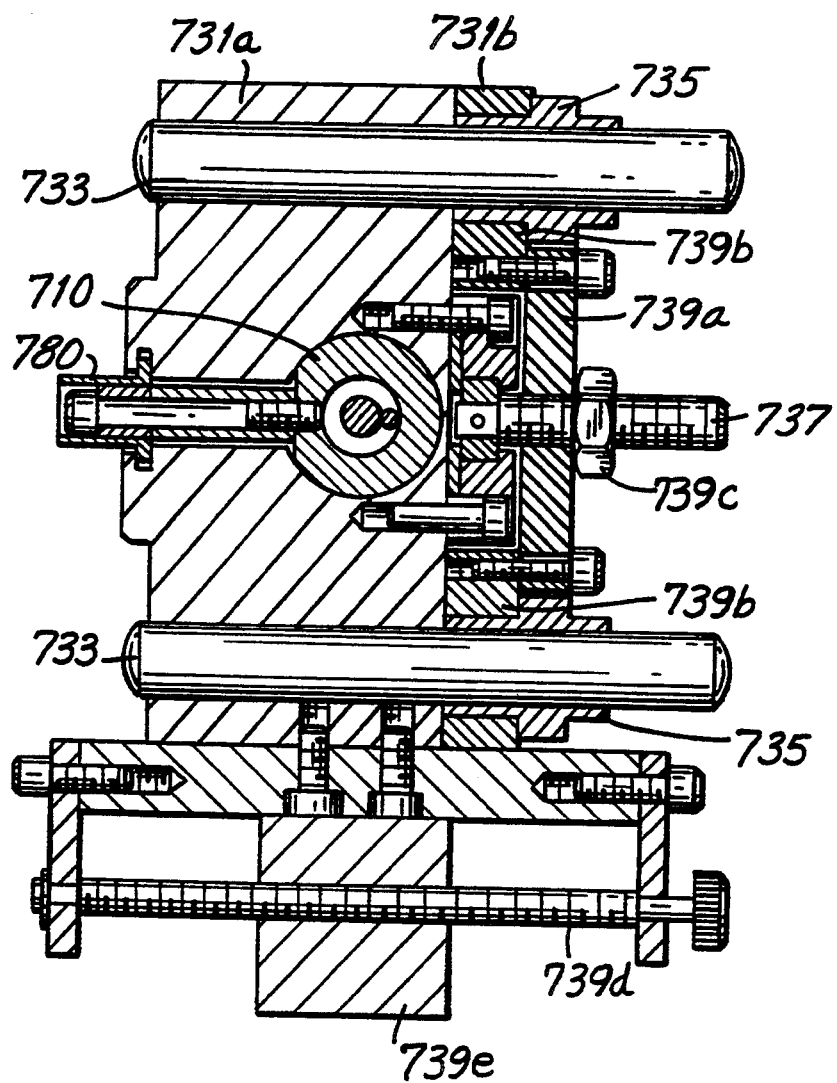
FIG. 28 is a sectional view taken along the line 28—28 in FIG. 26.
Figure 29:
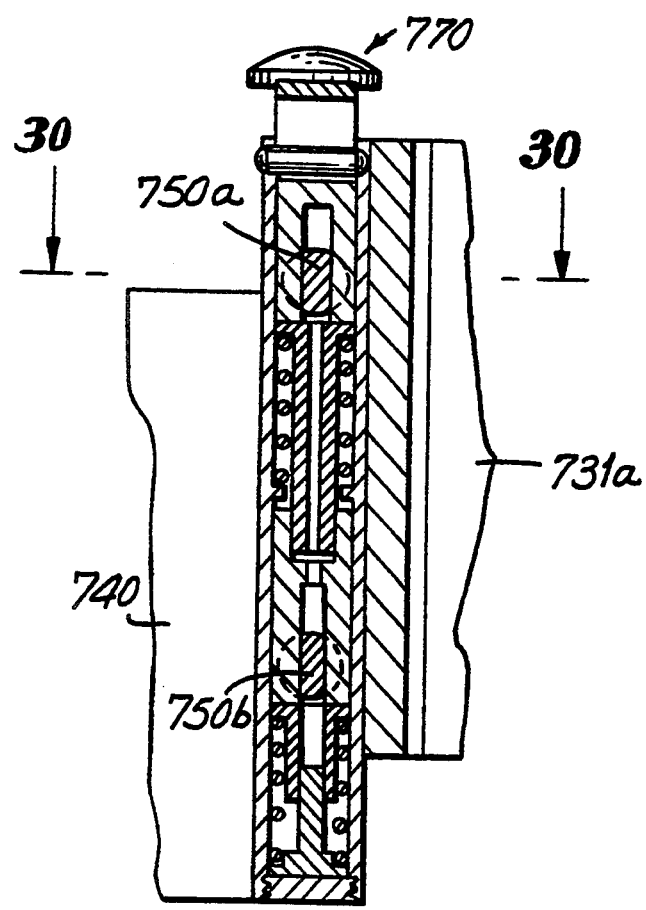
FIG. 29 is a partial sectional view taken along the line 29—29 in FIG. 27.
Figure 30:
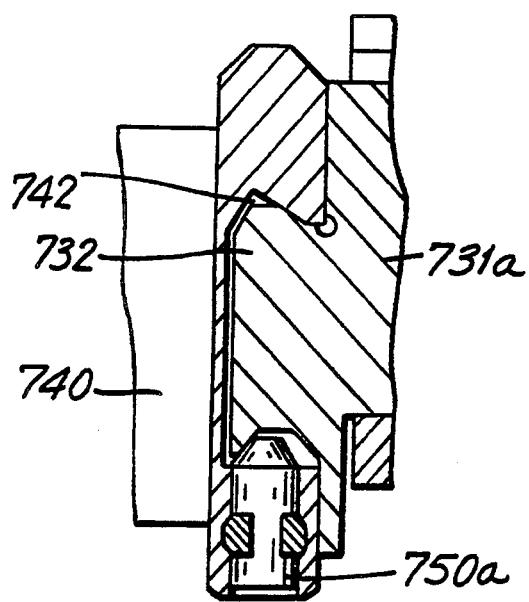
FIG. 30 is a partial sectional view taken along the line 30—30 in FIG. 29.

In the embodiment shown in FIGS. 22-24 the rear surface of shroud 630 includes a horizontal dovetail-shaped keyway 632 for receiving an outwardly flared key 642 on support body 640. Accordingly, shroud 630 can slide horizontally on or off of support body 640 parallel to the longitudinal axis of key 642 and keyway 632. Spring-biased balls 650 extend a short distance out of support body 640 into recesses in the rear surface of shroud 630 in order to provide a detent action to releasably locate shroud 630 at its desired working location along key 642. In addition, balls 650 may help take the "play" or looseness out of the connection between key 642 and keyway 632.

In the embodiment shown in FIGS. 22-24 hooking plate 680 is removably mounted on support body 640 in the same general way that hooking plate 80 is removably mounted on support body 40 in the embodiment shown in FIGS. 1-4. In the FIGS. 22-24 embodiment, however, member 610 is physically separated from member 130 except when member 130 is extended into contact with member 610. Thus in FIGS. 22-24 the linkage between member 130 and hooking plate 680 which reciprocates the hooking plate parallel to axis 22 is like the corresponding linkage in FIGS. 5-7, except that in FIGS. 22-24 this linkage is all part of the support body structure, thereby reducing the cost and complexity of the shroud assembly. The counterweight is also part of the support body structure to further reduce the cost, size, and weight of the interchangeable shrouds.

In the alternative embodiment shown in FIGS. 25-30 shroud 730 is both completely removable from support body 740 and adjustable without removal from support body 740 to accommodate stators which only change in length. Hooking plate 780 is mounted on shroud 730 and is therefore changed whenever the shroud is changed. In order to allow for length adjustment, shroud 730 is made in two parts 731a and 731b. Part 731a may be thought of as the main part, with part 731b being mounted on part 731a. The rear of shroud part 731a has a rearward projection 732 which forms a key removably receivable in a vertically oriented keyway 742 in the front face of support member 740. At the bottom of keyway 742, key 732 rests on a stop 744 attached to support member 740. This stop defines the vertical position of shroud 730 relative to support member 740.

Key 732 flares outwardly in the rearward direction so that it can be captured between inwardly inclined surfaces provided on one side by a side wall of keyway 742 and on the other side by the frustoconical ends of pins 750. As in other embodiments such as the one shown in FIGS. 5-7, pins 750 are retractable by pressing down on the topmost element 771a in actuator assembly 770. Actuator assembly 770 may be similar to assembly 270 in FIGS. 5-7 and therefore need not be described again in detail. When pins 750 are thus retracted, shroud 730 can be easily removed from support members 740 either by lifting key 732 out of keyway 742, or by pivoting the key out of the keyway. On the other hand, when pins 750 are not retracted, they continuously and resiliently urge key 732 into keyway 742, thereby holding the rear surface of shroud part 731a firmly against the front face of support body 740.

Shroud part 731b is movably mounted on shroud part 731a by means of two parallel rods 733 which extend from shroud part 731a through bushings 735 in shroud part 731b. Shroud part 731b is moved relative to shroud part 731a by rotating threaded rod 737. This causes elements 739a, 739, 735, and 731b to move toward or away from element 731a, depending on the direction of rotation of rod 737. Lock nut 739c can be tightened against element 739a when shroud part 731b is in the desired position. Threaded rod 739d can be rotated to shift weight 739e left or right as viewed in FIG. 28 to compensate for changes in the location of the center of gravity of shroud 730 due to shifting shroud part 731b relative to shroud part 731a. Weight 746 can be similarly shifted left or right as viewed in FIG. 27 by rotating threaded rod 748.

Hooking plate 780 is mounted and operated in substantially the same way that the hooking plate is mounted and operated in the above-described embodiments in which the hooking plate is mounted on the shroud.

It will be understood that the foregoing is merely illustrative of the principles of the invention, and that various modifications can be made by those skilled in the art without departing from the scope and spirit of the invention. For example, although the ability to adjust the shroud structure for different armature lengths without removing the shroud from the support structure has been shown only in connection with one of the above-described illustrative embodiments, it will be readily apparent that this feature can be added to others of the illustrative embodiments if desired. Similarly, although certain components of interfitting structures are shown associated with the shroud or the support body in the FIGS., it will be understood that these associations can sometimes be reversed so that an element shown on the shroud can be alternatively placed on the support body and vice versa.

The invention claimed is:

1. Apparatus for mounting an armature coil wire winding shroud on a support body so that the shroud is held firmly relative to said support body but is also readily removable from said support body comprising:
    a first reference surface on said support body;
    a second reference surface on said shroud; and
    means for resiliently urging said first and second reference surfaces toward and into contact with one another.

2. The apparatus defined in claim 1 wherein said first and second reference surfaces comprise inclined surfaces of mating dovetail key and keyway structures on said shroud and said support body, and wherein said means for resiliently urging comprises means for resiliently pushing said shroud and said support body apart along an axis which is substantially perpendicular to the longitudinal axis of said dovetail key and keyway structures.

3. The apparatus defined in claim 2 wherein said means for resiliently pushing comprises:
    a ball which is partly extendable from one of said shroud and said support body in order to contact the other of said shroud and said support body; and
    a spring for resiliently urging said ball to partly extend from said one of said shroud and said support body.

4. The apparatus defined in claim 3 wherein said other of said shroud and said support body has an aperture for receiving the extending portion of the ball at a predetermined position of said shroud relative to said support body parallel to the longitudinal axis of said dovetail key and keyway structures.

5. Apparatus for mounting an armature coil wire winding shroud on a support body so that the shroud is held firmly relative to said support body but is also readily removable from said support body comprising:
    a substantially prismatic projection from one of said shroud and said support body;
    a substantially prismatic aperture in the other of said shroud and said support body, said aperture being adapted to removably receive said projection;
    a ball which is selectively extendable from a side wall of said aperture into a recess in a side wall of said projection to hold said projection in said aperture; and
    means for selectively locking said ball in the position in which it extends from said side wall of said aperture into said recess.

* * * * *